United States Patent
Opincariu et al.

(10) Patent No.: US 12,072,868 B1
(45) Date of Patent: Aug. 27, 2024

(54) DATA RETENTION MANAGEMENT FOR PARTITIONED DATASETS

(71) Applicant: Amazon Technologies, Inc., Seattle, WA (US)

(72) Inventors: Daniel Opincariu, Redmond, WA (US); Sandeep Joshi, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 17/224,987

(22) Filed: Apr. 7, 2021

(51) Int. Cl.
*G06F 16/23* (2019.01)
*G06F 16/22* (2019.01)

(52) U.S. Cl.
CPC ...... *G06F 16/2379* (2019.01); *G06F 16/2228* (2019.01)

(58) Field of Classification Search
CPC .................... G06F 16/2379; G06F 16/2228
See application file for complete search history.

(56) References Cited

U.S. PATENT DOCUMENTS

| | | | | |
|---|---|---|---|---|
| 8,949,371 | B1 * | 2/2015 | Shrowty | G06F 21/6218 |
| | | | | 709/217 |
| 10,108,690 | B1 * | 10/2018 | Murray | G06F 16/278 |
| 10,976,950 | B1 * | 4/2021 | Trezzo | G06F 3/0652 |
| 2005/0238175 | A1 * | 10/2005 | Plotkin | H04L 9/0894 |
| | | | | 380/281 |
| 2011/0055559 | A1 | 3/2011 | Li et al. | |
| 2012/0158669 | A1 * | 6/2012 | Morsi | G06F 16/125 |
| | | | | 707/689 |
| 2013/0238575 | A1 * | 9/2013 | Amarendran | G06F 16/21 |
| | | | | 707/694 |
| 2016/0224660 | A1 * | 8/2016 | Munk | G06F 16/316 |
| 2018/0322170 | A1 * | 11/2018 | Alberton | G06F 16/24568 |
| 2019/0057101 | A1 * | 2/2019 | Esserlieu | G06F 3/0604 |
| 2019/0272335 | A1 | 9/2019 | Liu et al. | |
| 2019/0327152 | A1 | 10/2019 | Shemer et al. | |
| 2020/0272628 | A1 * | 8/2020 | Dageville | G06F 16/2379 |
| 2021/0034598 | A1 * | 2/2021 | Arye | G06F 16/288 |
| 2022/0092036 | A1 * | 3/2022 | Goodall | G06F 16/219 |

* cited by examiner

*Primary Examiner* — Robert W Beausoliel, Jr.
*Assistant Examiner* — Mohammad S Bhuyan
(74) *Attorney, Agent, or Firm* — Robert C. Kowert; Kowert, Hood, Munyon, Rankin & Goetzel, P.C.

(57) ABSTRACT

Systems and methods are disclosed to implement a data storage system that manages data retention for partitioned datasets. A received data retention policy specifies to selectively delete data from a dataset based on a set of data retention attributes. If the data retention attributes are part of the dataset's partition key, a first type of data deletion job is configured to selectively delete entire partitions of the dataset. Otherwise, the system will generate a retention attribute index for the dataset, which will be used by a second type of data deletion job to selectively delete individual records within the partitions. In embodiments, the retention attribute index is implemented as Bloom filters that track retention attribute values in each partition. Advantageously, the disclosed system is able to automatically configure deletion jobs for any dataset schema that avoids full scans of the dataset partitions.

20 Claims, 9 Drawing Sheets

DATA RETENTION MANAGEMENT FOR PARTITIONED DATASETS

BACKGROUND

As the technological capacity for organizations to create, track, and retain information continues to grow, a variety of different technologies for managing and storing the rising tide of information have been developed. Database systems, for example, provide clients with many different specialized or customized configurations of hardware and software to manage stored information. However, the increasing amounts of data that organizations must store and manage often correspondingly increases both the size and complexity of data storage and management technologies, like database systems, which in turn escalate the cost of maintaining the information. New technologies to process large amounts of various types of data may be implemented to efficiently query and maintain the different types of data. In recent years, data lake services have gained popularity with large-scale data users as a flexible means to store and process large amounts of semi-structured data.

For various reasons (e.g. data privacy regulations), some types of data must be expired from time to time. Data ownership in data lake systems is typically divided between two parties: the individual data owner and data lake service team. Due to this division of ownership, there is no single authority that is best able to manage data expiration for individual datasets. Data retention at the dataset level is typically the product of many business requirements, and the resulting data retention policies can be complex, especially because the datasets in a data lake are stored with varying types and amounts of schema information. There is currently no easy way for data owners to define and implement data retention policies on their data lake datasets. Ad hoc data retention solutions for individual datasets are time consuming to implement and costly to maintain. Worse, such solutions can be inefficient during execution, resulting in large operational and compute costs at execution time.

Figure 1:
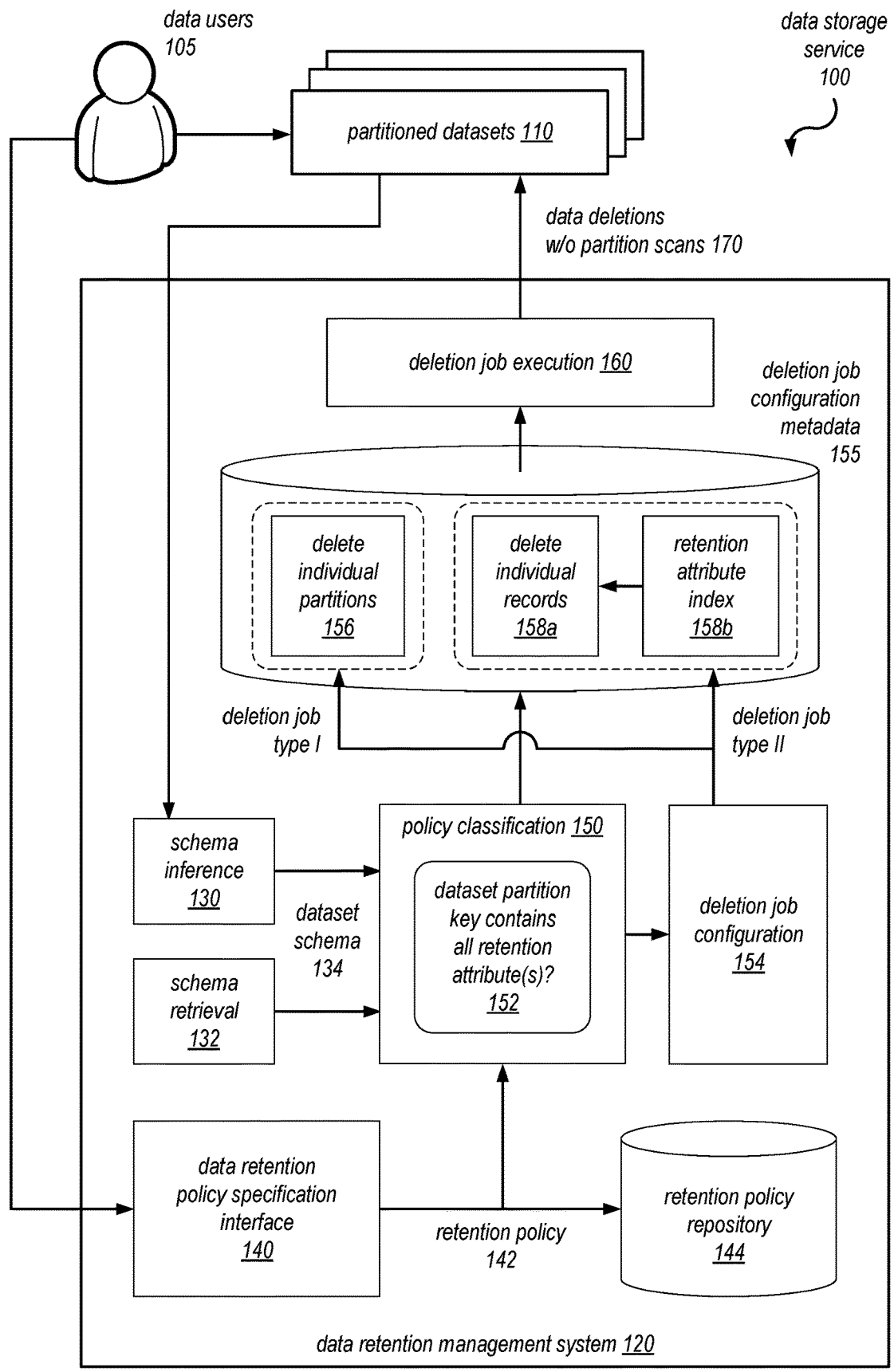
FIG. 1 is a block diagram illustrating a data storage service that generates and executes data deletion jobs on partitioned datasets based on specified data retention policies, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Systems and methods are disclosed herein to implement a data storage service that manages data retention policies for partitioned datasets. In some embodiments, the data storage service may be a data lake service for storing semi-structured and unstructured data for a large number of clients.

In some data lake systems, data ownership is divided between two parties; individual data owners who have legal control over their data, and the data lake service team who owns the central catalog of the system and manages the data on behalf of data owners. While this ownership model provides freedom to clients of data lake systems to publish and consume data, it creates challenges for managing data retention policies within the system (e.g. to comply with data privacy regulations). The two-party ownership model means that there is no single authority that is responsible for both defining the retention policy at the business level and implementing the policies at the system level. Data retention for individual datasets is typically the product of the complex business requirements from both data producers and consumers. Once a retention policy is defined for a dataset, it must be handed over to the service team to implement the policy as ongoing data expiration processes. However, ad hoc implementation of data expiration processes for individual datasets can be time consuming and costly. Due to the large variety of dataset schemas and data retention policies typically seen in these systems, management of data retention policies on an individual dataset or client basis quickly becomes intractable. In addition, the data deletion processes used to implement data retention policies can often be inefficient. For example, depending on how the dataset is organized, a recurring deletion job may require a complete scan of the dataset to identify data items to expire. These scans can incur large operational and compute costs, which can cause noticeable impacts on the dataset's users.

To address these problems in the state of the art and to improve upon current techniques for implementing and managing data retention policies in data storage systems, embodiments of a data retention management system are disclosed herein. In some embodiments, the data retention management system uses a two-tier solution to maintain two different types of data retention policies depending on the organization of the target dataset.

In some embodiments, the data retention management system may implement a categorization layer or component, which focuses on categorizing or classifying the data retention policy into one of two types. A first type of policy (type I policies) is a policy whose data retention key set is part of the dataset's partition key. A second type of policy (type II policies) is a policy where the retention key set is not part of the dataset's partition key. In some embodiments, the classification is accomplished by executing pre-defined rules on the policy and the dataset schema and persisting the categorization results for later use. For a given dataset, the classification may be performed as a one-time activity intended to save compute cost on repeated data expiration processes every time a retention-based deletion is triggered. The categorizing layer or component may implement a rule engine service responsible to fetch the dataset schema (or data definition) from an external service and execute the pre-defined rules to determine/categorize the data retention policy into either type I or type II. In some embodiments, in the absence of a dataset schema definition, the rule engine can rely on data lake crawlers to infer the dataset schema and proceed with the rule execution. In some embodiments, the categorization layer or component may also be configured to enrich the classified policy with additional metadata including, but not limited, to retention duration, retention column name, size and number of the partitions, etc. In some embodiments, the configuration metadata generated by the categorization layer is persisted to a storage layer.

In some embodiments, once the data retention policy metadata is generated and stored, it is used by a programmatic data deletion layer or component to execute data deletion jobs on the dataset. The deletion jobs may be run periodically to identify and delete the out-of-retention data from the dataset. The programmatic data deletion layer will employ different data deletion strategies on datasets depending on the type of the data retention policy.

In some embodiments, for type I retention policies, where retention attribute(s) are part of the dataset partition key, the deletion job will initiate retention-based deletions by retrieving the partition keys from the dataset. In some data lake systems, this information is available by invoking an API provided by the system and does not involve scanning the entire dataset. The retrieved partition keys are used to identify individual partitions of the dataset that have expired by matching the partition key against the retention policy criteria (e.g. an expiration date). Once identified, all the expired partitions are deleted, resulting in a dataset that only holds the data as required by the data retention policy. Advantageously, type I data deletion jobs produce much faster results, as it avoids the need to scan individual records within the partitions. In some embodiments, in order to delete a partition, the deletion job may place an empty shard file in the file stream for the dataset and dereference the link to the previous shard file in the dataset's manifest. The dereferenced file may be later garbage collected by the system. In this manner, the partition is deleted atomically in real time with minimal impact on the dataset's users.

In some embodiments, for type II retention policies, the system will create a Bloom filter-based index to catalog the retention key values in each partition. Often, most partitions of a dataset consist of historical records that are in an archival state, which will no longer be updated. Accordingly, the retention value index does not need to be updated for these archived partitions. In some embodiments, the index may be updated whenever a partition is updated so that the index reflects the current state of the partitions. Advantageously, use of the retention attribute index reduces the need of the brute-force scans and enables the data deletion job to quickly identify partitions that contain expired records. To delete the records, in some embodiments, the deletion job will generate a delete bundle modeled as an update file and place it in the stream to be processed. In some embodiments, the update file will tombstone or hide all records in a partition that is out of retention scope. In some embodiments, such deleted records may be garbage collected at a later time (e.g. during a data compaction or cleanup of the partitions).

As will be appreciated by those skilled in the art, the disclosed data retention management system implements a number of features to improve the functioning of current data storage systems. First, the disclosed system provides data owners an easy-to-use interface to specify sophisticated data retention policies, which are then automatically converted into programmatic data deletion processes. The configured deletion processes perform deletions in an efficient manner, avoiding full scans of datasets where possible (e.g. by relying on the partition keys of existing partitions or generated retention attribute indexes). In some embodiments, a partition is deleted by dereferencing the partition in a manifest, so that impact of the deletion on other dataset users is minimized. In some embodiments, the retention value index is built using a space-efficient probabilistic data structure such as Bloom filters. The Bloom filters provide an approximate representation of the contents of a partition using a fixed sized data structure that does not grow with the number of stored values. Finally, the combination of features allows the data storage service to automate implementation and execution data deletion process in a generalized way, for a wide variety of semi-structured datasets and data retention policies. These and other features and benefits of the disclosed data retention management system are described in further detail below, in connection with the figures.

FIG. 1 is a block diagram illustrating a data storage service that generates and executes data deletion jobs on partitioned datasets based on specified data retention policies, according to some embodiments.

As shown, the depicted data storage service 100 is configured to store partitioned datasets 110. In some embodiments, these datasets 110 may be unstructured or semi-structured, where some of the data in the datasets is not defined by a data schema. The datasets 110 may include a wide variety of data, such as images, binary objects, log records, emails, documents, and the like, as well as fully-structured data such as tabular data. The datasets 110 are partitioned in that they are physically stored in a number of distinct portions or partitions. In some embodiments, each partition may be stored as a separate file or object that are listed in a manifest of the partition. In some embodiments, a partition may be stored as an underlying object or file storage service.

As shown, the data storage service allows different data users 105 to access the datasets 110. The users 105 includes both data producers and data consumers. In some embodiments, the data storage service may implement a data access management system that assigns to each data user a user identifier and an associated set of data access rights, so that access to the datasets 110 can be controlled.

As shown, the data storage service in this example implements a data retention management system 120. Depending on the embodiment, the data retention management system may be implemented as part of the data storage service, or a separate subsystem on top of or outside of the data storage service. As shown, any data user 105 may specify a data retention policy for a dataset via the data retention policy specification interface 140. In some embodiments, the data retention management system will enforce data retention on a dataset 110 by taking a union of all client-specified data retention policies on the dataset. In some embodiments, the data retention policy specification interface 140 may be provided as a graphical user interface (GUI), such as a web-based interface. In some embodiments, the interface 140 may be implemented as a programmatic interface (e.g. an API) that can be called by other software components, such as a client software used by the data users. The data retention policy specification interface is configured to receive data retention policies from the data users 105, for example, to allow users to specify data retention or deletion rules, which may be used to periodically expire data from the dataset. The received data retention policies 142 from the users 105 are saved to a retention policy repository 144. The repository 144 allows the retention policies of all users to be stored so that they can be later viewed or modified.

In some embodiments, once a data retention policy is received by the data retention management system 120, the system will attempt to determine the schema 134 of the associated dataset. In particular, the system will attempt to ascertain the partition key of the dataset, which is used to determine how data records are assigned to the partitions. In some embodiments, the data retention management system may use a schema retrieval component 132 to retrieve the data schema of the dataset from a schema store within the data storage service or some external data source. In some embodiments, the system may allow the user to specify the data schema explicitly via the specification interface 140. In some embodiments, the data retention management system may employ a schema inference tool 130 (e.g. a dataset crawler) to infer the data schema of the dataset. For example, the schema inference tool may perform an analysis of a sample of the dataset to determine information such as the expected attributes of records in the dataset, the sort order of the records, and the partition scheme of the dataset (e.g. the partition keys of the dataset).

As shown, once the data schema information 134 is determined, it is forwarded to a policy classification component 150. In some embodiments, this component 150 implements the functionality of a categorization layer of the data retention management system 120, as discussed previously. In particular, the policy classification component 150 will examine the newly received data retention policy 142 and the data schema 134 of the dataset, and determine 152 if the dataset's partition key contains all retention attributes of the retention key set. The answer to this question is used to determine a type of the data retention policy (type I or type II), as discussed previously. In particular, a type I policy is one where the specified retention key set is part of the dataset's partition key, whereas a type II policy is a policy where the retention key set is not part of the dataset's partition key. As just one example, if the dataset is partitioned based on a "year" attribute of the dataset as the partition key, a data retention policy based on an "owner" attribute will be classified as a type II policy. Note that not all partition keys and data retention keys will necessarily be a date or time attribute; other types of attributes may also be used. As shown, in some embodiments, the results of the policy classification 150 is stored in a repository of deletion job configuration metadata 155. This metadata 155 will be used by the programmatic data deletion layer (e.g. deletion job execution component 160) to carry out deletion jobs in accordance with received data retention policies.

In some embodiments, after the type or classification of the data retention policy is determined, a deletion job configuration component 154 is used to configure aspects of a data deletion job, which may be executed, possibly periodically, to delete data from the dataset that are outside the scope of data retention. As shown, if the data retention policy is classified as a type I policy, metadata for a type I deletion job will be generated in the configuration metadata repository 155. In this type of deletion job, entire partitions will be deleted 156 based on the partition key range of the partitions. For example, if the entire range of partition key values in a partition falls outside of the data retention scope, the type I deletion job will delete that entire partition.

Conversely, if the data retention policy is classified as a type II policy, metadata for a type II deletion job will be generated. With this deletion job type, a retention attribute index 158a is created to track the values of the retention attributes in each partition. In some embodiments, the index will be updated to reflect the current state of the individual partitions. When the type II deletion job is run, the retention attribute index 158a is checked to identify each partition that contains data records that needs to be deleted. The deletion job will then carry out a process to delete 158b individual records within each identified partition. In this manner, the scanning of entire partitions in the dataset may be skipped. In some embodiments, the retention attribute index 158a may be implemented so that it provides a definitive answer as to whether a partition contains a particular retention attribute value. In other embodiments, the retention attribute index 158a may be implemented as probabilistic data structures such as Bloom filters. Bloom filters may provide false positives as to whether a partition contains a particular retention attribute value. However, Bloom filters are fixed in size, so they will not become extremely large when there are a large number of distinct retention attribute values. In some embodiments, the system may choose to use a probabilistic data structure such as a Bloom filter for the index 158a based on a statistical analysis of the dataset.

As shown, after the deletion job configuration metadata is generated for a data retention policy, it will be used by the deletion job execution component 160 to perform data deletions 170 on the dataset. In some embodiments, these deletion jobs may be executed periodically according to a schedule, which may be specified as part of the deletion job configuration metadata 155. In some embodiments, deletion jobs may be triggered by other events, such as a data change in another dataset, an external signal, a user command, etc. As discussed, the data deletion jobs are configured so that they will avoid full scans of the dataset when possible, in order to perform the deletions more efficiently (e.g. more quickly and using less computing resources). Using these components of the data retention management system 120 as discussed, the data storage service 100 can provide its users with an easy-to-use interface to define data retention policies, which can be automatically implemented as efficient data deletion jobs, for virtually any type of partitioned dataset.

Figure 2:
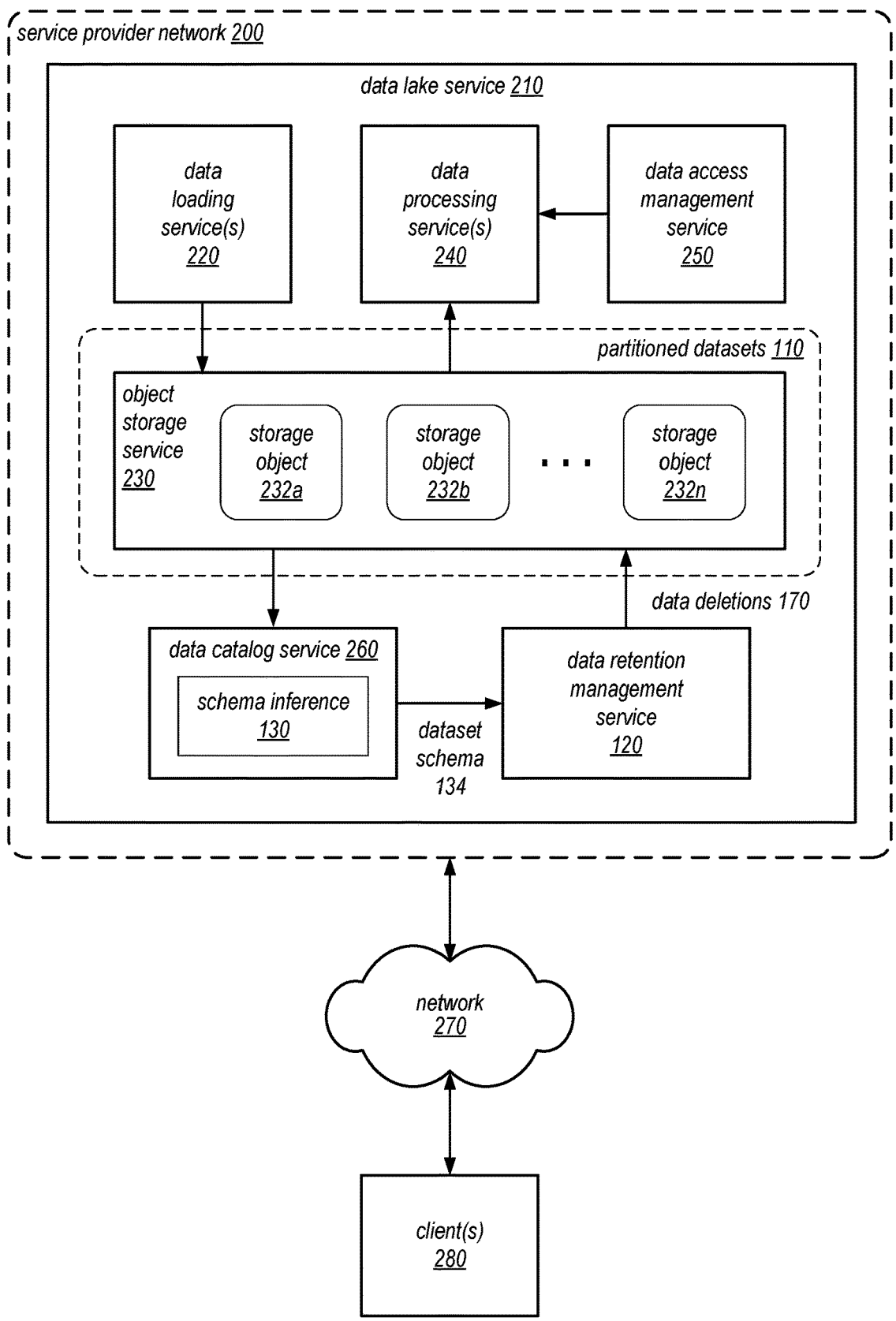
FIG. 2 illustrates a data lake service provided by a network-accessible service provider network that implements a data retention management service, according to some embodiments.

FIG. 2 illustrates a data lake service provided by a network-accessible service provider network that implements a data retention management service, according to some embodiments. The data lake service 210 shown in the figure is an embodiment of the data storage service 100 of FIG. 1.

In some embodiments, the service provider network 200 may be a private or closed system or may be set up by an entity such as a company or a public sector organization to provide one or more services (such as various types of cloud-based storage) accessible via the Internet and/or other networks to clients 280. Service provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the service provider network 200.

In some embodiments, service provider network 200 may implement a data lake service 210 that may be used to store various types of structured, semi-structured, or unstructured data for a large number of clients. The data lake service 210 may be constructed using other computing resource services provided by the service provider network. As shown in this example, the data lake service 210 is constructed using data loading service(s) 220, object storage service 230, data processing service(s) 240, (e.g., relational or non-relational (NoSQL) database query engines, map reduce processing, data flow processing, and/or other large scale data processing techniques), data access management service 250 (e.g., implementing an access control scheme for data processing service(s) 240 to gain permission to access datasets stored in the data lake service), data catalog service 260, as well as other data storage services (e.g., database services, such as a data warehouse) which may in turn rely upon a data storage service acting as an underlying data store), and/or any other type of network based services (which may include various other types of storage, processing, analysis, communication, event handling, visualization, and security services not illustrated).

In various embodiments, the components illustrated in the figure may be implemented directly within computer hardware, as instructions directly or indirectly executable by computer hardware (e.g., a microprocessor or computer system), or using a combination of these techniques. For example, the components of in the figure may be implemented by a system that includes a number of computing nodes (or simply, nodes), each of which may be similar to the computer system embodiment illustrated in FIG. 10 and described below. In various embodiments, the functionality of a given system or service component (e.g., a component of data lake service 210) may be implemented by a particular node or may be distributed across several nodes. In some embodiments, a given node may implement the functionality of more than one service system component (e.g., more than one data store component).

In some embodiments, the data loading service 220 may provide extraction, transformation, and loading capabilities to place data into datasets 110 at one or more of the various object storage service(s) 230. For example, data loading service 220 may provide clients with the resources to create, maintain, and orchestrate data loading jobs that take one or more datasets, perform various transformation operations, and store the transformed data for further processing (e.g., by one or more data processing service(s) 240).

In some embodiments, the object storage service(s) 230 may implement different types of data stores for storing, accessing, and managing storage objects 232a-n on behalf of clients 280 as a network-based service that enables clients 280 to operate a data storage system in a cloud or network computing environment. In some embodiments, individual storage objects 232 are used to implement the individual partitions of datasets 110, as discussed in connection with FIG. 1. In some embodiments, the data lake service 210 provides a view of datasets 110 over the storage objects 232, so that data users interact with the datasets 110 through data lake service APIs, as opposed to the object storage service 230 or the underlying storage objects 232. In some embodiments, the object storage service(s) 230 may be used to implement a storage layer for the data lake service 210. In some embodiments, the storage layer may be used to store service metadata, such as the retention policy repository 144 and/or the deletion job configuration metadata 155.

In some embodiments, the data processing services 240 may include various types of data processing services to perform different functions (e.g., query or other processing engines to perform functions such as anomaly detection, machine learning, data lookup, or any other type of data processing operation). For example, in at least some embodiments, data processing services 240 may include a map reduce service that creates clusters of processing nodes that implement map reduce functionality over data stored in one of object storage services 230. Various other distributed processing architectures and techniques may be implemented by data processing services 240 (e.g., grid computing, sharding, distributed hashing, etc.). Note that in some embodiments, data processing operations may be implemented as part of object storage service(s) 230 (e.g., query engines processing requests for specific data). Data processing service(s) 240 may interact with the data catalog service 260 and data access management service 250 in order to obtain dataset schema information and/or a lease (or permission) to perform various processing operations with respect to the datasets 110.

In some embodiments, the data catalog service 260 may provide a catalog service that ingests, locates, and identifies data stored on behalf of clients in data lake service 210. For example, a dataset stored in a non-relational format may be identified along with a container or group in an object-based data store that stores the dataset along with other data objects on behalf of the same customer or client. In at least some embodiments, data catalog service 260 may direct the transformation of data ingested in one data format into another data format. For example, data may be ingested into object storage service 230 as a single file or semi-structured set of data records (e.g., JavaScript Object Notation (JSON) records). Data catalog service 260 may be configured to identify the data format of the single file or semi-structured set of data. In at least some embodiments, the data stored in another data format may be converted to a different data format as part of a background operation (e.g., to discover the data type, column types, names, delimiters of fields, and/or any other information to construct the table of semi-structured data in order to create a more structured version of the dataset). In some embodiments, the schema inference component 130 as discussed in connection with FIG. 1 is implemented as part of the data catalog service 260.

In some embodiments, the data lake service 210 will implement a data retention management service 120 that implements the functionality of the data retention management system 120 of FIG. 1. As discussed, the data retention management service 120 may be configured to receive data retention policies about datasets from various users, configure data deletion or expiration processes (e.g. deletion jobs) to carry out the retention policies, and then perform the data deletions 170 on the datasets. As shown, in some embodiments, the data retention management service 120 may obtain the data schema 134 of the datasets from the data catalog service 260.

Generally speaking, the clients 280 may encompass any type of client configurable to submit network-based requests to service provider network 200 via network 270, including requests for storage services (e.g., a request to create, read, write, obtain, or modify data in data lake service 210). For example, a given client 280 may include a suitable version of a web browser, or may include a plug-in module or other type of code module configured to execute as an extension to or within an execution environment provided by a web browser. Alternatively, a client 280 may encompass an application such as a database application (or user interface thereof), a media application, an office application or any other application that may make use of storage resources in data lake service 210 to store and/or access the datasets to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 280 may be an application configured to interact directly with service provider network 200. In some embodiments, client 280 may be configured to generate network-based services requests according to a Representational State Transfer (REST)-style network-based services architecture, a document- or message-based network-based services architecture, or another suitable network-based services architecture.

In some embodiments, a client 280 may be configured to provide access to provider network 200 to other applications in a manner that is transparent to those applications. For example, client 280 may be configured to integrate with an operating system or file system to provide storage on the data lake service 210. However, the operating system or file system may present a different storage interface to applications, such as a conventional file system hierarchy of files, directories and/or folders. In such an embodiment, applications may not need to be modified to make use of the storage system service model. Instead, the details of interfacing to the data lake service 210 may be coordinated by client 280 and the operating system or file system on behalf of applications executing within the operating system environment.

In some embodiments, the clients 280 may convey network-based services requests and receive responses from service provider network 200 via network 270. In various embodiments, network 270 may encompass any suitable combination of networking hardware and protocols necessary to establish network-based-based communications between clients 280 and service provider network 200. For example, network 270 may generally encompass the various telecommunications networks and service providers that collectively implement the Internet. Network 270 may also include private networks such as local area networks (LANs) or wide area networks (WANs) as well as public or private wireless networks. For example, both a given client 280 and the service provider network 200 may be respectively provisioned within enterprises having their own internal networks. In such an embodiment, the network 270 may include the hardware (e.g., modems, routers, switches, load balancers, proxy servers, etc.) and software (e.g., protocol stacks, accounting software, firewall/security software, etc.) necessary to establish a networking link between given client 280 and the Internet as well as between the Internet and service provider network 200. It is noted that in some embodiments, clients 280 may communicate with service provider network 200 using a private network rather than the public Internet.

Figure 3:
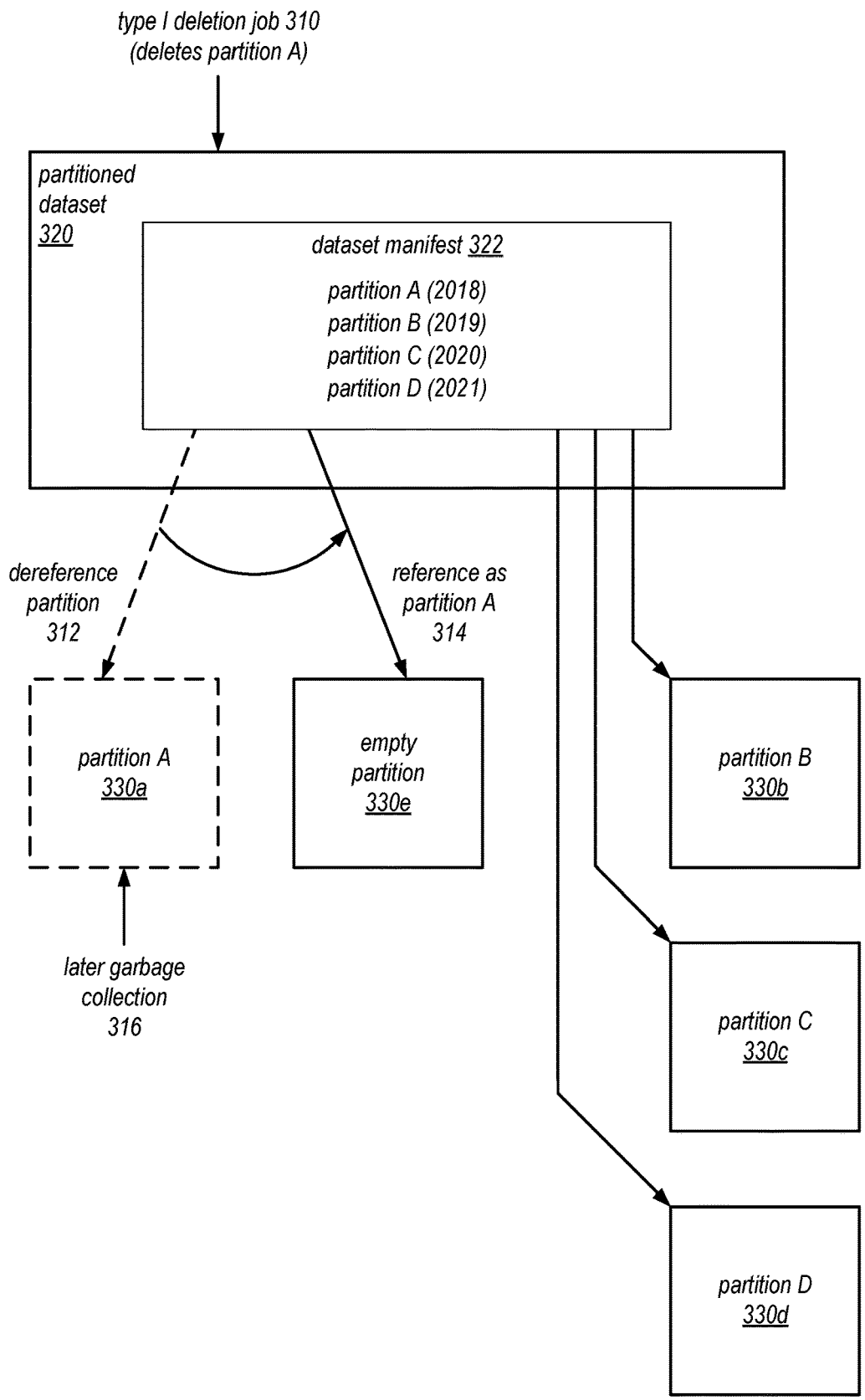
FIG. 3 illustrates a first type of data deletion job implemented by the data storage service that deletes entire dataset partitions based on the dataset partition key, according to some embodiments.

FIG. 3 illustrates a first type of data deletion job implemented by the data storage service that deletes entire dataset partitions based on the dataset partition key, according to some embodiments. The deletion job 310 shown in the figure is an embodiment of the type I deletion job, as discussed in connection with FIG. 1.

As shown in this example, the deletion job 310 will delete partition A from the partitioned dataset 320. Partitioned dataset 320 includes four partitions A, B, C, and D (330*a-d*), as indicated by the manifest 322 of the dataset. In some embodiments, the manifest may be a parameter file or record that indicates various properties of the dataset, including its partitions and the storage locations of the partitions. In this example, the partitions are divided by a year attribute in the dataset (years 2018 to 2021). The deletion of partition A may be triggered based on a determination that records in year 2018 are now out of retention scope. Because the deletion job 310 is a type I deletion job, the entire partition A will be deleted.

As shown, the deletion of partition A will occur in two steps. First, the manifest 322 is updated to dereference the link that points to old partition A 330*a*. As discussed, partition A may be a storage object or file, which may be stored in an underlying object storage service such as object storage service 230 of FIG. 2. The manifest 330 will then be updated to reference 314 an empty partition 330*e* as the new partition A. In this manner, the old partition A is effectively removed from the dataset from the user's perspective. In some embodiments, the old partition A 330*a* will be finally deleted during a later garbage collection process 316, which may sweep the object storage service to delete any unreferenced data objects. In this manner, the initial removal of partition A can occur relatively easily, as an immediate operation that changes the link in the manifest file. This operation will cause little impact to the other users of the dataset 320. In some embodiments, a partition that was incorrectly deleted may be brought back by relinking the old partition 330*a* in the manifest, before the old partition is finally garbage collected.

Figure 4:
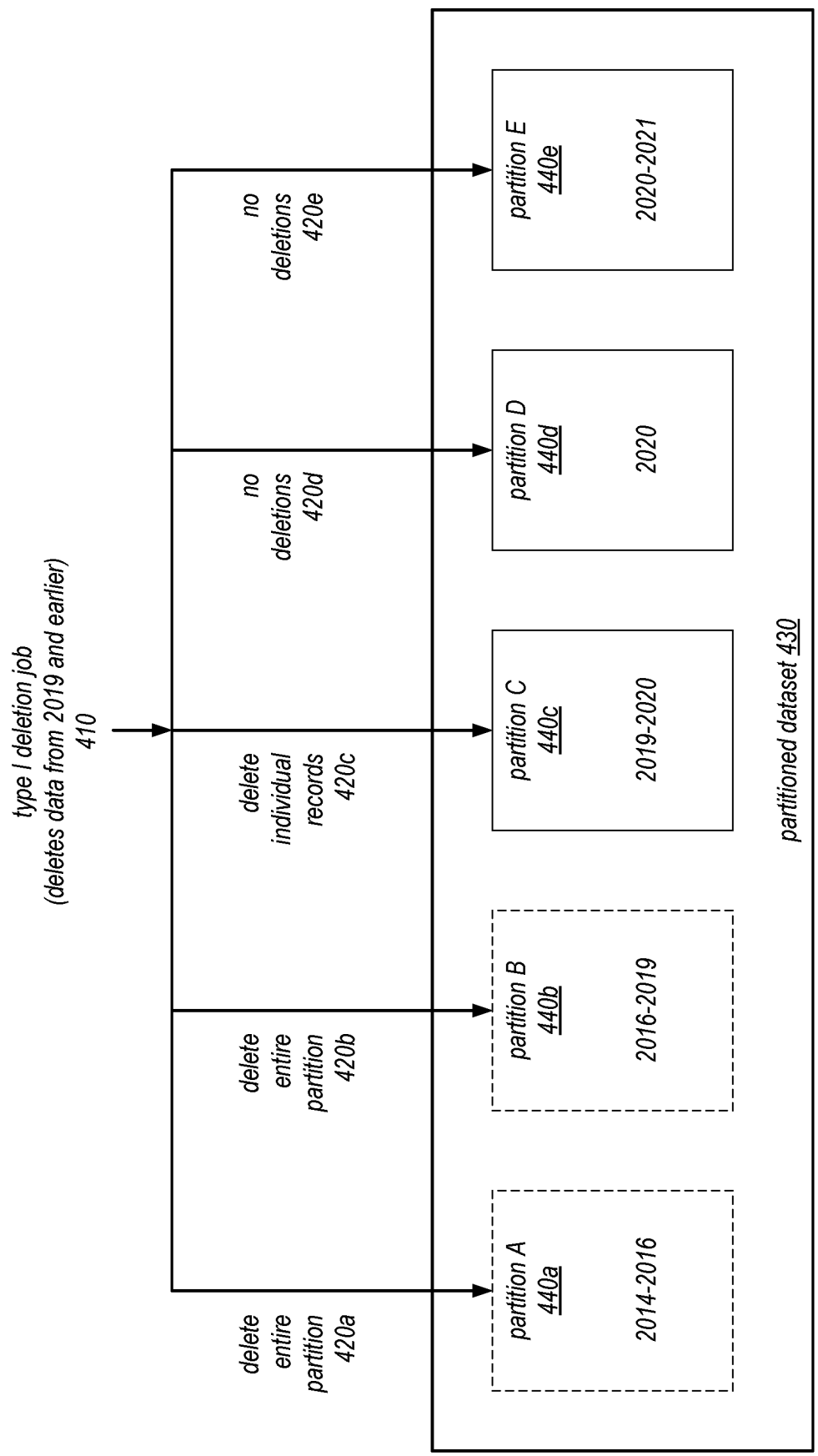
FIG. 4 illustrates another example of a type I deletion job implemented by the data storage service that deletes both entire partitions and individual records in partitioned datasets, according to some embodiments.

FIG. 4 illustrates another example of a type I deletion job implemented by the data storage service that deletes both entire partitions and individual records in partitioned datasets, according to some embodiments.

As shown in this example, the deletion job 410 is initiated to delete data from 2019 and earlier in a partitioned dataset 430. As shown, the partitions 440*a-e* of the dataset do not divide the data records of the dataset at the year boundary. For example, records from 2019 spans both partitions B and C.

In this example, the deletion job 420 will perform two different types of deletion operations based on the partition key ranges of the partitions 440. First, partitions whose partition key range falls completely outside of the data retention scope (partitions A and B) are deleted entirely (420*a*, 420*b*). These partitions may be deleted using the process described in connection with FIG. 3. Partitions that have only a subset of records outside of the data retention scope (partition C) will not be deleted entirely. For such partitions, the deletion job will delete a subset of records 420*c* in the partition that are outside the retention scope. In some embodiments, the deletion of individual records may be accomplished without a full scan of the partition, for example, by implementing a data filter to hide the subset of data records from users of the dataset. Finally, for partitions whose data lie fully within the data retention scope (partitions D and E), no deletion operations will be performed on these partitions (420*d*, 420*e*).

Figure 5:
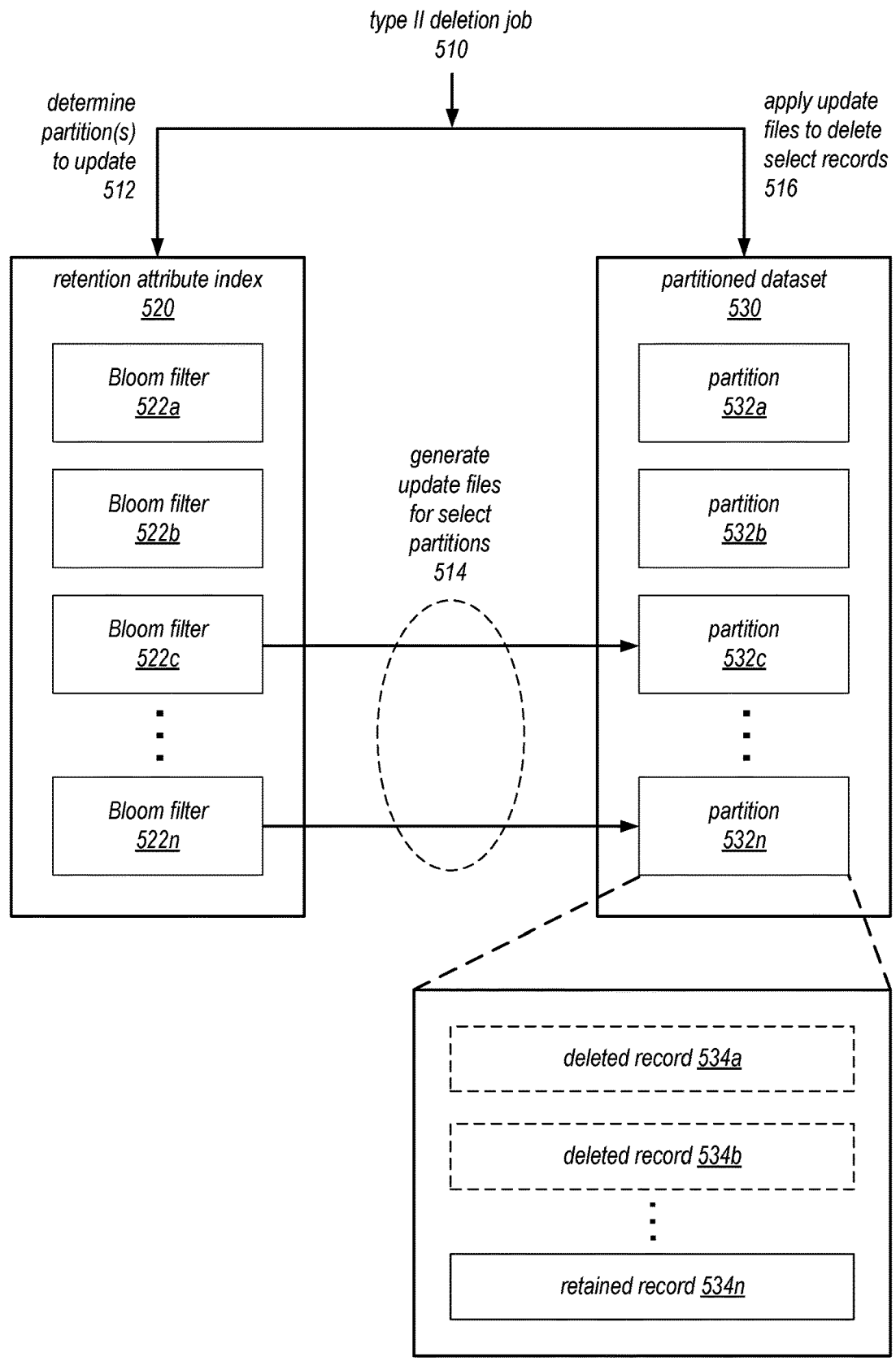
FIG. 5 illustrates a second type of data deletion job (type II deletion job) implemented by the data storage service that deletes individual records within a partitioned dataset using a retention attribute index, according to some embodiments.

FIG. 5 illustrates a second type of data deletion job (type II deletion job) implemented by the data storage service that deletes individual records within a partitioned dataset using a retention attribute index, according to some embodiments. The deletion job 510 shown in the figure is an embodiment of the type II deletion job, as discussed in connection with FIG. 1.

As shown, deletion job 510 begins by checking a retention attribute index 520 for the partitioned dataset 530 to determine 512 the partitions in a dataset 530 that need to be updated by the deletion job. The retention attribute index 520 may be the retention attribute index 158*a* of FIG. 1. As shown, the index includes a set of Bloom filters 522*a-n*, one for each partition 532*a-n* of the dataset 530. In some embodiments, each Bloom filter 522 will indicate whether particular values of a retention key set exist in the corresponding partition. For example, a Bloom filter may be queried to determine whether records with year attribute "2021" and owner attribute "Bob" exist in a particular partition. As may be understood by those skilled in the art, the Bloom filter may be used to hash different values to a fixed set of buckets, so that the data structure will potentially return false positives for a queried value. However, the Bloom filter is a space-efficient data structure of fixed size, so it will not grow to an excessive size when there are a large number of distinct values in the index. In some embodiments, the system may use another type of indexing data structure that can provide definitive results as to whether a partition does or does not contain records of a particular retention key value.

As shown, once the partitions to be updated are identified, a set of update files are generated 514 for the identified partitions. The update files are applied 516 to the corresponding partitions (in this example partitions 532*c* and 532*n*) to delete individual records in these partitions. As shown in this example, data records 534*a* and 534*b* in partition 532*n* are deleted, while data record 534*n* is retained. In some embodiments, the deletions may not immediately remove the affected records. Rather, the affected records may simply be filtered out or hidden from the dataset's users, until they are finally removed at a later time. In some embodiments, the data records may be tombstoned, which may be finally deleted after a specified period of time in a cleanup or garbage collection process. In some embodiments, tombstoned records may be brought back to the dataset before they are finally garbage collected.

Figure 6:
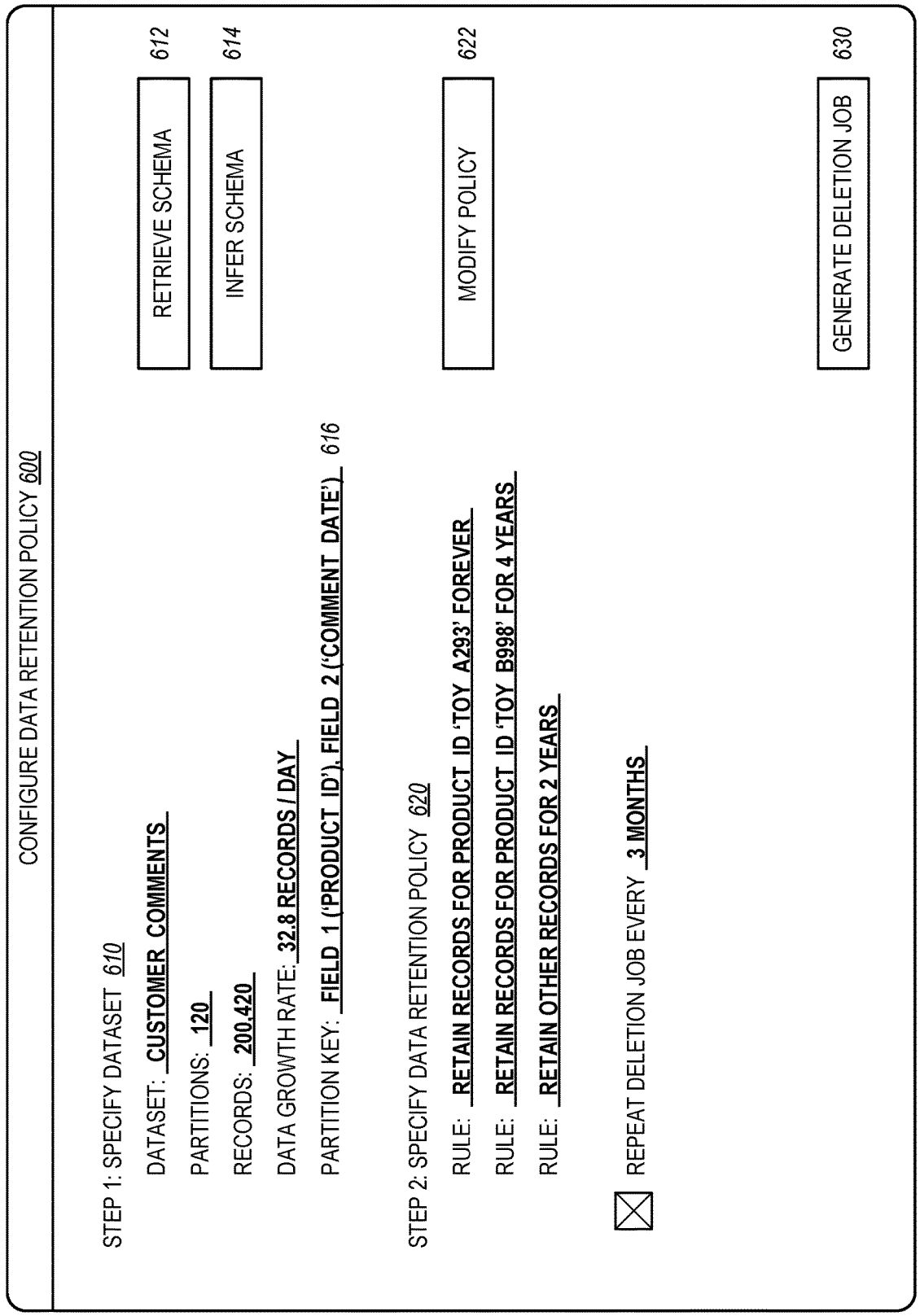
FIG. 6 illustrates an example graphical user interface that allows users to specify data retention policies and configure data deletion jobs in a data storage service, according to some embodiments.

FIG. 6 illustrates an example graphical user interface that allows users to specify data retention policies and configure data deletion jobs in a data storage service, according to some embodiments. The GUI 600 shown in the figure is an embodiment of the data retention policy specification interface 140 of FIG. 1.

As shown, the GUI 600 includes two sections that take a user through two steps of a configuration process for a data retention policy. Section 610 (step 1) allows the user to specify the dataset (here CUSTOMER_COMMENTS) to which the data retention policy will apply. The section 610 also shows a number of properties of the dataset, such as the number of partitions, the number of records, the data growth rate. Depending on the embodiment, other types of dataset information maintained by the data storage service may also be provided to the user. The section also includes two buttons for determining the schema of the dataset. Button 612 may be used to retrieve the data schema from a data catalog or an external data source, using a component such as the schema retrieval component 132 of FIG. 1. Button 614 may be used to infer the schema using a tool as the schema inference component 130 of FIG. 1. As shown in this example, the schema of the dataset has been determined, and indicates that the dataset's partition key 616 consists of the PRODUCT_ID and COMMENT_DATE attributes of the dataset.

As shown, section 620 of the GUI (step 2) allows the user to specify rules to define the data retention policy of the dataset. In this example, the defined data retention policy includes three rules that specify how long different types of data records should be retained in the dataset. However, it is noted that the specific manner in which data retention policies are specified can vary depending on the embodiment. In some embodiments, the policy rules may indicate when records should be expired or deleted. In some embodiments, the policy rules may specify retention or expiration criteria that do not depend on a time-based attribute of the dataset (e.g. a time or date attribute). In some embodiments, different users may specify different policy rules for a dataset, and the system may combine the different rules to, for example, retain data that falls within the retention scope of any of the rules. In this example, button 622 may be used to add, remove, or change the rules associated with the data retention policy. Finally, the GUI in this case allows the user to specify how often the resulting data deletion job should be executed. In this case, the deletion job will be scheduled for execution every three months. Once the user is satisfied with all parameters of the data retention policy, button 630 may be used to generate the deletion job. Clicking button 630 will cause the system to initiate configuration of the data deletion job(s) for the configured data retention policy, for example, using the policy classification component 150 and the deletion job configuration component 154 of FIG. 1.

Figure 7:
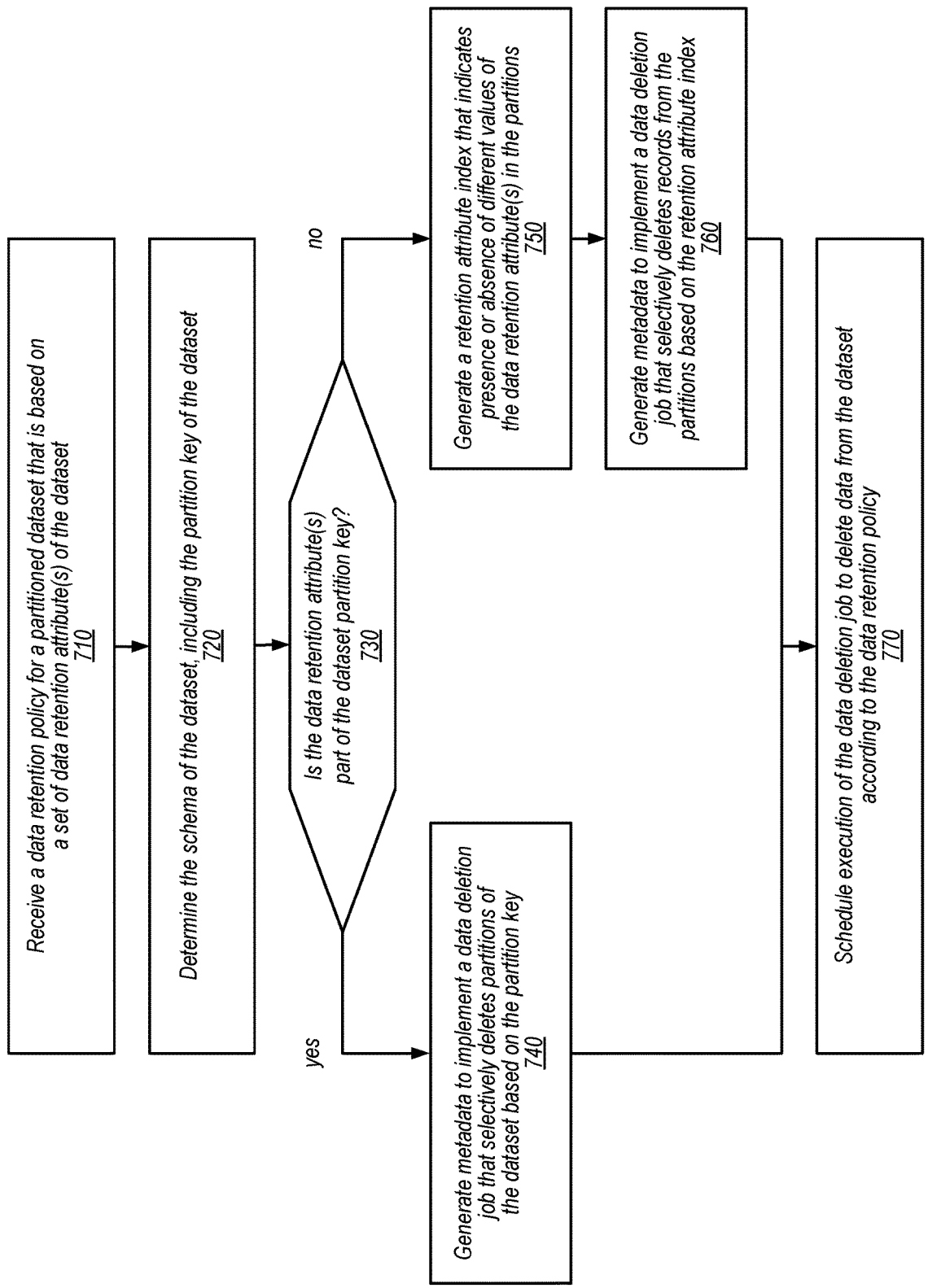
FIG. 7 is a flowchart illustrating a process performed by a data storage service to configure and execute a data deletion job on a partitioned dataset based on a data retention policy, according to some embodiments.

FIG. 7 is a flowchart illustrating a process performed by a data storage service to configure and execute a data deletion job on a partitioned dataset based on a data retention policy, according to some embodiments. The depicted process may be performed by an embodiment of the data storage service 100 of FIG. 1.

The process begins at operation 710, where a data retention policy is received for a partitioned dataset. For example, the data retention policy may be the data retention policy 142 of FIG. 1, and received from a data user via the data retention policy specification interface 140 of FIG. 1. As discussed, the data retention policy specification interface may be provided as an user interactive interface (e.g. GUI 600 of FIG. 6) or a programmatic that can be invoked by other software components (e.g. an API). The data retention policy may specify a set of data retention attribute(s) of the dataset, which is used to define one or more rules regarding when data in the dataset should be retained or deleted.

At operation 720, the schema of the dataset is determined, including the partition key of the dataset. In some embodiments, the dataset schema may be explicitly provided by the user, for example, via the data retention policy specification interface. In some embodiments, the dataset's schema may be retrieved using a data retrieval component (e.g. data retrieval component 132) from a data catalog maintained by the data storage system or an external source. In some embodiments, the data schema may be inferred using a data schema inference tool (e.g. schema inference component 130). The data schema inference tool may be configured to analyze a sample of the records in the dataset to determine the likely schema of the dataset, including the partition key of the dataset.

At operation 730, a determination is made whether the data retention attribute(s) used by the data retention policy is part of the dataset partition key. The answer to this question is used to determine a type of the data retention policy (e.g. type I policy or type II policy, as discussed), and choose a type of data deletion job used to implement the policy (type I deletion job or type II deletion job). In some embodiments, other factors may be considered to select among additional types of policies or data deletion jobs. In some embodiments, this operation may be performed by a policy categorization or classification layer of the system, which may implement a component such as the policy classification component 150 of FIG. 1. In some embodiments, the determined type or classification of the data retention policy may be saved in a data deletion job configuration repository, such as the delete job configuration metadata repository 155 of FIG. 1.

If the data retention attribute(s) are part of the dataset partition key, the process proceeds to operation 740, where metadata is generated to implement a data deletion job that selectively deletes partitions of the dataset based on the partition key. Thus, this operation will generate a type I deletion job as discussed in connection with FIG. 1. When a type I deletion job is executed, an entire partition may be deleted based on the range of partition key values in the partition. The decision to delete a partition (or not) can be made without scanning the partition. In some embodiments, this operation may be performed by the deletion job configuration component 154 of FIG. 1, and the generated metadata may be stored in metadata repository 155 of FIG. 1.

If the data retention attribute(s) are not part of the dataset partition key, the process proceeds to operation 750, where a retention attribute index (e.g. retention attribute index 158a) is generated, which indicates a presence or absence of different values of the data retention attribute(s) in the dataset's partitions. The generation of the index is used to avoid scanning the partitions during execution of a type II deletion job. In some embodiments, the index may consist of a number of space-efficient probabilistic data structures such as Bloom filters. One Bloom filter may be generated for each partition, and the Bloom filters will be used to store retention key values that exist in each of the partitions. In some embodiments, the Bloom filters may be generated as part of the storage layer of the data storage service, which may be the same storage layer that is used to store the dataset.

The process next proceeds to operation 760, where metadata is generated to implement a data deletion job (type II deletion job) that selectively deletes records from the partitions based on the retention attribute index. During execution of the type II deletion job, the retention attribute index will be checked to determine a subset of the partitions that possibly have data records that are outside of the retention scope. The deletion jobs will then selectively delete records from this subset of partitions. By using the retention attribute index, the subset of partitions can be identified without scanning in the partitions. In some embodiments, the selective deletion of records from a partition may also be performed without scanning the partition. In some embodiments, operations 750 and 760 may be performed by the deletion job configuration component 154 of FIG. 1, and the generated metadata may be stored in metadata repository 155 of FIG. 1.

Finally, the process proceeds to operation 770, where execution of the configured data deletion job is scheduled. Once scheduled, the data deletion job will execute (possibly repeatedly) to delete data from the dataset according to the data retention policy. In some embodiments, the scheduling of the data deletion job may be specified by the user, for example, via a configuration interface such as GUI 600 of FIG. 6.

Figure 8:
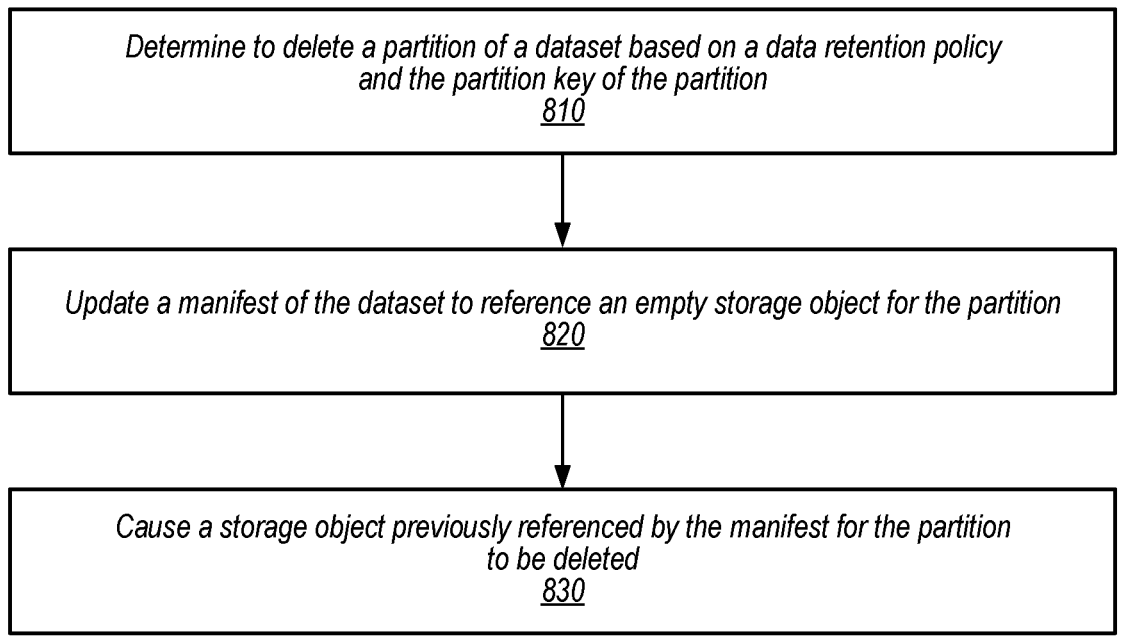
FIG. 8 is a flowchart illustrating a process of deleting a partition in a partitioned dataset during execution of a type I data deletion job by a data storage service, according to some embodiments.

FIG. 8 is a flowchart illustrating a process of deleting a partition in a partitioned dataset during execution of a type I data deletion job by a data storage service, according to some embodiments. The depicted process may be performed by a programmatic data deletion layer of the data storage service 100 of FIG. 1, for example, the deletion job execution component 160 of FIG. 1.

At operation 810, the data deletion job determines to delete a partition of the dataset based on a data retention policy and the partition key of the partition. In some embodiments, this determination is made without having to scan the partitions of the dataset. For example, in some embodiments, the data storage service may store the partition key ranges of the dataset in separate metadata, and this information may be obtained via one or more API calls. If the partition key range of a partition lies completely outside of the retention policy scope, that partition will be deleted. In some embodiments, if a partition's partition key range is only partly outside the retention policy scope, the partition itself will be retained. However, the data deletion job may delete a subset of the records from the partition, in the manner discussed in connection with FIG. 4.

Once it is determined that a partition will be deleted, at operation 820, the data deletion job updates a manifest of the dataset to reference an empty storage for the partition. In some embodiments, the manifest may be a metadata record maintained for the partitioned dataset, and may indicate (e.g. link) the storage location of each partition of the dataset. To quickly delete a partition, the deletion job updates the manifest to cause the partition to point to an empty storage object, so that from the perspective of the dataset's users, all data in the partition is removed from the dataset. In some embodiments, this manner of deleting the partition is used so that the deletion can be performed more quickly and with little or no impact on the dataset's users.

At a later time, at operation 830, the system will cause the storage object previously referenced by the manifest for the deleted partition to be actually deleted. In some embodiments, this operation may not be performed as part of the data deletion job, but occur asynchronously as part of a periodic garbage collection process. For example, in some embodiments the storage object may be stored in an underlying object storage service or storage layer, and the data storage service may cause the underlying storage service or layer to periodically purge objects that have been dereferenced for a sufficient amount of time.

Figure 9:
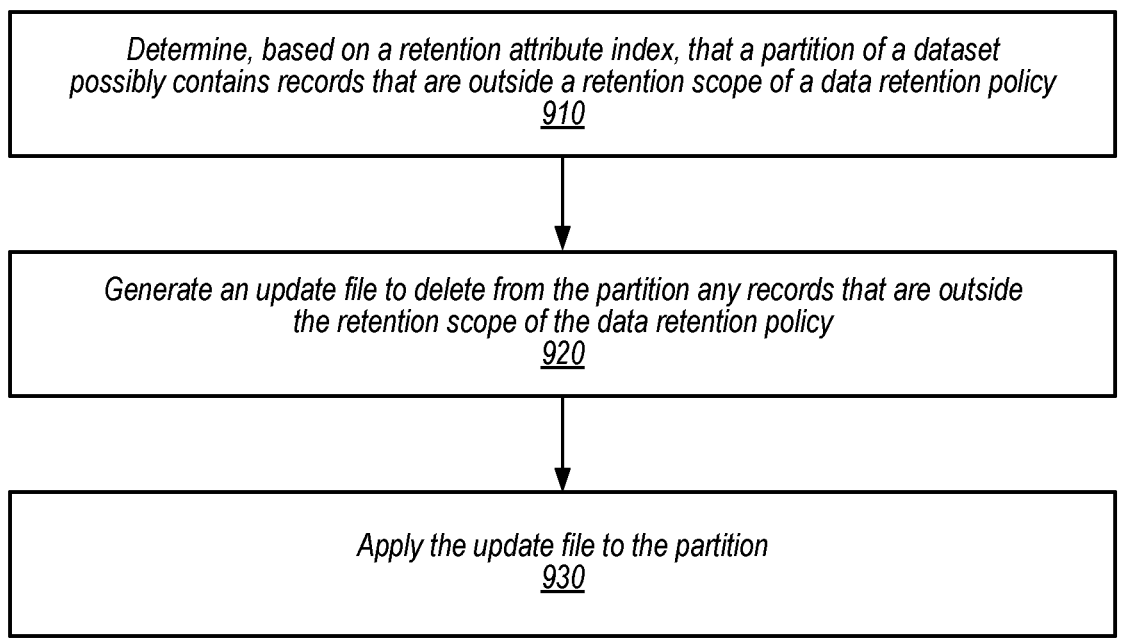
FIG. 9 is a flowchart illustrating a process of deleting individual records in a partitioned dataset during execution of a type II data deletion job by a data storage service, according to some embodiments.

FIG. 9 is a flowchart illustrating a process of deleting individual records in a partitioned dataset during execution of a type II data deletion job by a data storage service, according to some embodiments. The depicted process may be performed by a programmatic data deletion layer of the data storage service 100 of FIG. 1, for example, the deletion job execution component 160 of FIG. 1.

At operation 910, the data deletion job determines, based on a retention attribute index (e.g. retention attribute index 158a), that a partition of a dataset possibly contains records that are outside the retention scope of a data retention policy for the dataset. As discussed, this determination is made without scanning the dataset. If the index indicates that the dataset does not contain data records that are outside the retention scope, the data deletion job will simply skip that partition. However, if the index indicates that the dataset does contain records outside the retention scope, the data deletion job will proceed to the next operations to delete records from the dataset.

At operation 920, an update file is generated to delete from the partition any records that are outside the retention scope of the data retention policy. In some embodiments, the update file may physically remove records from the partition. In some embodiments, the update file may not physically remove the records, but rather act as a filter to hide the records from the dataset's users. In some embodiments, the filter may simply specify a filtering criterion (as opposed to record IDs), so that the deletion does not require a scan of the partition. In some embodiments, the filtering of the records may be achieved by adding a tombstone to the deleted records. Records that are filtered or tombstoned may be finally deleted at a later time, for example, via a data compaction process. The update file is applied to the partition at operation 930 to complete the deletion of records in the partition.

Figure 10:
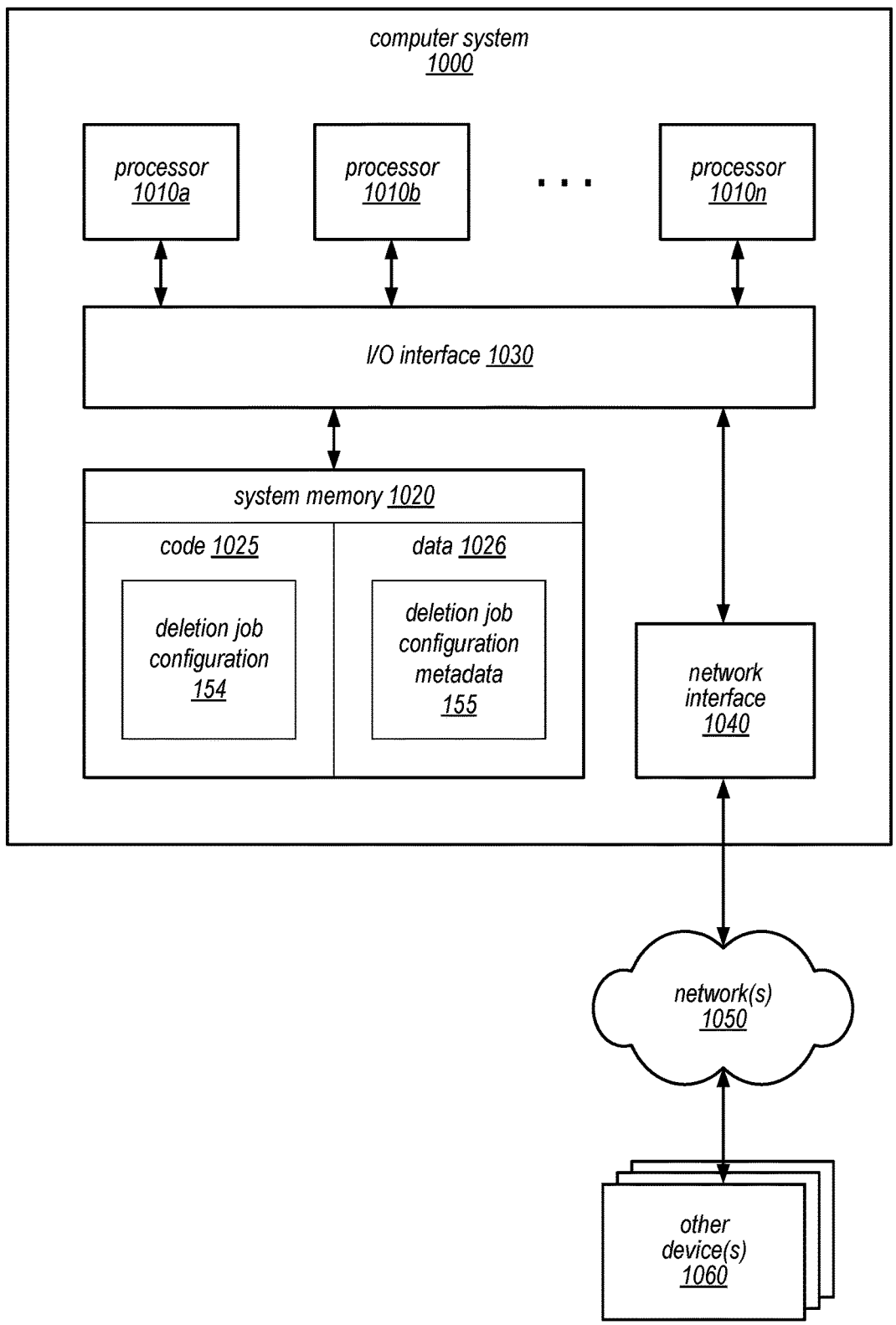
FIG. 10 is a block diagram illustrating an example computer system that can be used to implement one or more portions of a data retention management system that generates and executes data deletion jobs on partitioned datasets based on specified data retention policies, according to some embodiments.

FIG. 10 is a block diagram illustrating an example computer system that can be used to implement one or more portions of a data retention management system that generates and executes data deletion jobs on partitioned datasets based on specified data retention policies, according to some embodiments.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device. As shown, computer system 1000 includes one or more processors 1010, which may be the multithreading processor 140 of FIG. 1. These processors 1010 may multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010a-n, as shown. In various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may store instructions that implement the deletion job configuration component 154, as discussed. The system memory 1020 may also be used to store data 1026 needed or produced by the executable instructions. For example, the in-memory data 1026 may be used to store the deletion job configuration metadata 155, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system comprising:
one or more computer devices implement a data storage service, configured to:
store a plurality of datasets for a plurality of clients, wherein the datasets are partitioned based on different partition schemes and associated with different client-specified data retention policies;
receive a first data retention policy for a first dataset, and in response:
determine that the first data retention policy is a first type of data retention policy associated with a first deletion job type, wherein a first set of one or more data retention attributes of the first data retention policy is part of a first partition key of the first dataset; and
generate a first metadata to implement a first data deletion job of the first deletion job type, wherein the first data deletion job selectively deletes partitions of the first dataset based on the first partition key;
receive a second data retention policy for a second dataset, and in response:
determine that the second data retention policy is a second type of data retention policy associated with a second deletion job type, wherein a second set of one or more data retention attributes of the second data retention policy is not part of a second partition key of the second dataset;
generate, based at least in part on the determination that the second data retention policy is the second type of data retention policy associated with the second deletion job type, a retention attribute index of the second dataset for use by the second deletion job type, wherein the retention attribute index indicates a presence or absence of different values of the second set of data retention attributes in individual partitions of the second dataset; and
generate a second metadata to implement a second data deletion job of the second deletion job type, wherein the second data deletion job selectively deletes records from the partitions of the second dataset based on the retention attribute index;
schedule the first data deletion job to delete data from the first dataset according to the first data retention policy; and
schedule the second data deletion job to delete data from the second dataset according to the second data retention policy.

2. The system of claim 1, wherein:
to implement the data storage service, the one or more computer devices are configured to implement a data lake service configured to store semi-structured datasets;
the data lake service is implemented in a service provider network accessible over one or more public networks; and
the data lake service is implemented using a plurality of virtual computing resources hosted on physical hosts in the service provider network.

3. The system of claim 1, wherein the second set of data retention attributes includes at least one attribute that is not a time or date attribute.

4. The system of claim 1, wherein:
the partitions of the first dataset are implemented using underlying storage objects managed by an object storage service; and
to delete a first partition from the first dataset, the one or more computer devices of the data storage service are configured to:
update a manifest of the first dataset to reference an empty storage object for the first partition; and
cause the object storage service to delete a storage object previously referenced by the manifest for the first partition.

5. The system of claim 1, wherein to generate the retention attribute index, the one or more computer devices of the data storage service are configured to:
generate Bloom filters for individual partitions of the second dataset.

6. A method comprising:
performing, by one or more computer devices that implement a data storage service:
storing a plurality of datasets for a plurality of clients, wherein the datasets are partitioned based on different partition schemes and associated with different client-specified data retention policies;
receiving a first data retention policy for a first dataset, and in response:
determining that the first data retention policy is a first type of data retention policy associated with a first deletion job type, wherein a first set of one or more data retention attributes of the first data retention policy is part of a first partition key of the first dataset; and
configuring a first data deletion job of the first deletion job type to implement the first data retention policy, wherein the first data deletion job selectively deletes partitions of the first dataset based on the first partition key; and
receiving a second data retention policy for a second dataset, and in response:
determining that the second data retention policy is a second type of data retention policy associated with a second deletion job type, wherein a second set of one or more data retention attributes of the second data retention policy is not part of a second partition key of the second dataset;
generating, based at least in part on the determination that the second data retention policy is the second type of data retention policy associated with the second deletion job type, a retention attribute index of the second dataset for use by the second deletion job type, wherein the retention attribute index indicates a presence or absence of different values of the second set of data retention attributes in individual partitions of the second dataset; and configuring a second data deletion job of the second deletion job type to implement the second data retention policy, wherein the second data deletion job selectively deletes records from the partitions of the second dataset based on the retention attribute index.

7. The method of claim 6, wherein:
the data storage service is a data lake service accessible over one or more public networks; and
the method further includes storing, by the data lake service, semi-structured datasets for a plurality of clients.

8. The method of claim 6, further comprising performing, by the data storage service:
analyzing the first dataset to infer a schema of the first dataset, including the first partition key of the first dataset.

9. The method of claim 6, wherein the first set of data retention attributes includes at least one attribute that is not a time or date attribute.

10. The method of claim 6, wherein:
the partitions of the first dataset are implemented using underlying storage objects managed by a data storage service; and
the method further includes executing the first deletion job by the data retention management service, including:
determining to delete a first partition from the first dataset;
updating a manifest of the first dataset to reference an empty storage object for the first partition; and
causing the data storage service to delete a storage object previously referenced by the manifest for the first partition.

11. The method of claim 6, wherein generating the retention attribute index for the second dataset comprises:
generating Bloom filters for individual partitions in the second dataset.

12. The method of claim 6, further comprising performing, by the data storage service:
updating the retention attribute index when the second dataset is updated.

13. The method of claim 6, further includes executing the second deletion job by the data storage service, including:
determining from the retention attribute index that a second partition of the second dataset possibly contains records that are outside a retention scope of the second data retention policy; and
generating an update file to delete from the second partition any records that are outside the retention scope of the second data retention policy.

14. The method of claim 6, further comprising executing the first data deletion job by the data storage service, including:
determining that one partition of the first dataset does not contain any records that are to be retained according to the first data retention policy;
deleting the one partition;
determining that another partition of the first dataset contains a subset of records that are to be deleted according to the first data retention policy; and
deleting the subset of records of the other partition.

15. The method of claim 6, further comprising performing, by the data storage service:
providing a graphical user interface (GUI) configured to receive user input indicating the first dataset and the first data retention policy for the first dataset;
receiving, via the GUI, user approval of the first data retention policy; and
generating configuration metadata for the first data deletion job in response to the user approval.

16. One or more non-transitory computer-accessible storage media storing program instructions that when executed on or across one or more processors of one or more computer systems of a data storage service implement a data retention management system of the data storage service, wherein:
the data storage service is configured to store a plurality of datasets for a plurality of clients, wherein the datasets are partitioned based on different partition schemes and associated with different client-specified data retention policies; and
the program instructions when executed on or across the one or more processors cause the data retention management system to:
receive a first data retention policy for a first dataset, and in response:
determine that the first data retention policy is a first type of data retention policy associated with a first deletion job type, wherein a first set of one or more data retention attributes of the first data retention policy is part of a first partition key of the first dataset; and
configure a first data deletion job of the first deletion job type to implement the first data retention policy, wherein the first data deletion job selectively deletes partitions of the first dataset based on the first partition key; and
receive a second data retention policy for a second dataset, and in response:
determine that the second data retention policy is a second type of data retention policy associated with a second deletion job type, wherein a second set of one or more data retention attributes of the second data retention policy is not part of a second partition key of the second dataset;
generate, based at least in part on the determination that the second data retention policy is the second type of data retention policy associated with the second deletion job type, a retention attribute index of the second dataset for use by the second deletion job type, wherein the retention attribute index indicates a presence or absence of different values of the second set of data retention attributes in individual partitions of the second dataset; and
configure a second data deletion job of the second deletion job type to implement the second data retention policy, wherein the second data deletion job selectively deletes records from the partitions of the second dataset based on the retention attribute index.

17. The one or more non-transitory computer-accessible storage media of claim 16, wherein the program instructions when executed on or across the one or more processors cause the data retention management system to:
analyze the first dataset to infer a schema of the first dataset, including the first partition key of the first dataset.

18. The one or more non-transitory computer-accessible storage media of claim 16, wherein:

the partitions of the first dataset are implemented using underlying storage objects managed by an object storage service; and to delete a first partition from the first dataset, the program instructions when executed on or across the one or more processors cause the data retention management system to:

update a manifest of the first dataset to reference an empty storage object for the first partition; and cause the object storage service to delete a storage object previously referenced by the manifest for the first partition.

19. The one or more non-transitory computer-accessible storage media of claim 16, wherein to generate the retention attribute index, the program instructions when executed on or across the one or more processors cause the data retention management system to:

generate Bloom filters for individual partitions in the second dataset.

20. The one or more non-transitory computer-accessible storage media of claim 16, wherein the program instructions when executed on or across the one or more processors cause the data retention management system to:

execute the second deletion job, including to:

determine from the retention attribute index that a second partition of the second dataset possibly contains records that are outside a retention scope of the second data retention policy; and generate an update file to delete from the second partition any records that are outside the retention scope of the second data retention policy.

* * * * *